June 14, 1966  A. B. KJELLSTRÖM  3,256,467
METHODS AND ARRANGEMENTS TO INFLUENCE
AND CONTROL CHARGES
Filed Sept. 24, 1962

Inventor
Axel Bertilsson Kjellström
By Pierce, Scheffler & Parker
Attorneys

United States Patent Office 3,256,467
Patented June 14, 1966

3,256,467
METHODS AND ARRANGEMENTS TO INFLU-
ENCE AND CONTROL CHARGES
Axel Bertilsson Kjellström, Angskarsgatan 3,
Stockholm, Sweden
Filed Sept. 24, 1962, Ser. No. 225,914
1 Claim. (Cl. 317—200)

The present invention relates to an apparatus for influencing electric charges comprising means for generating and maintaining a rotating magnetic field the direction of which is parallel to the axis of rotation thereof and means for supplying electric charges to said field.

It is an object of the invention to control electric charges in vapour, gas and vacuum. Other objects, features and advantages of this invention will suggest themselves to those skilled in the art and will become apparent from the following description of the invention taken in connection with the accompanying drawing in which:

FIG. 1a–h shows schematically the direction of magnetic fields and electric charges;

Figure 1:
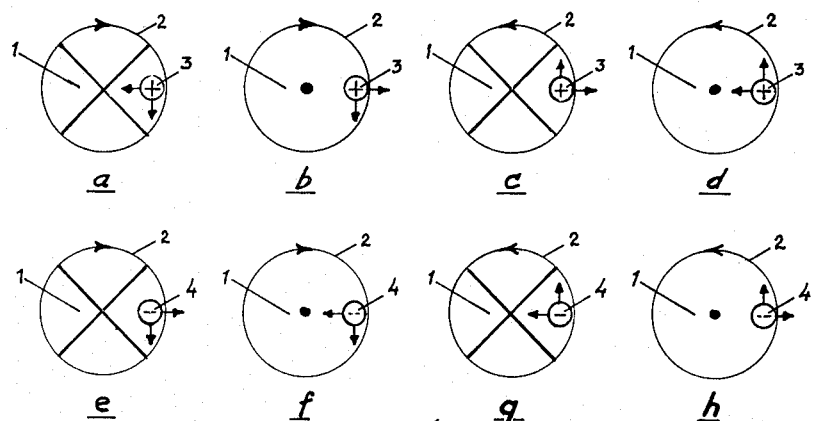

In FIG. 1a–h, 1 denotes magnetic fields, for the main part orthogonal to the plane of the drawing, and directed downward in FIGS. 1a, c, e and g and upward in FIGS. 1b, d, f and h. The direction of rotation of the magnetic fields is indicated by arrow points. The effective control area of the magnetic fields covers at least the surface of circles 2. 3 denotes a positive, and 4, a negative electric charge or charge carrier, such as a charged particle, ion, electron, proton etc., within the active control area.

If a magnetic field having a field direction perpendicular to the plane of the drawing is made to rotate around an axis at right angles to the plane of the drawing, e.g. by having the means producing the magnetic field rotate, which means may be, for instance, a permanent magnet, electro-magnet and/or equivalent, the magnetic field remaining otherwise unchanged, e.g. as to field strength and direction, it has been established that the charges 3, 4 are acted upon by forces with directions as indicated by the arrows attached to the signs denoting the charges. The said forces act in the sense of rotation of the field and point toward, or away from, the center of rotation, depending on the direction of the field, the direction of rotation, and the sign of the charge.

If the direction of rotation is maintained but the direction of the field is reversed, forces acting tangentially will remain unchanged whereas radial forces will be reversed. Similarly, if the direction of the field is maintained but the direction of rotation is reversed, both tangential and radial forces will be reversed.

The above conditions have proved to hold true for magnetic fields of such size and symmetry that they may be considered homogeneous within their area of active influence, and also whether the electric charge is in motion and/or subjected to the influence of one or more other fields, e.g. electrical and/or magnetic fields.

Figure 2:
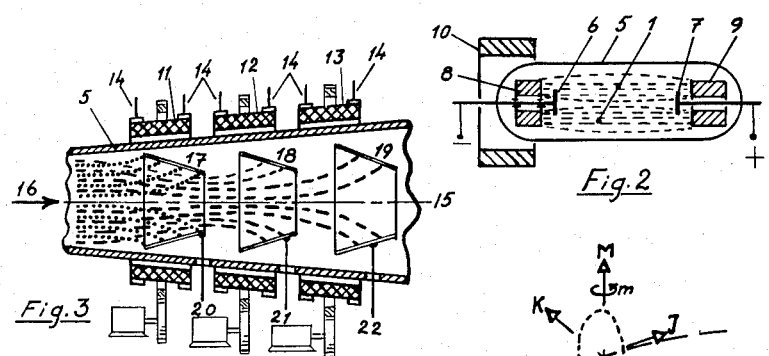
FIG. 2 shows a discharge vessel with two poles which may be rotated.

FIG. 2 shows, schematically, an embodiment of the invention as applied in connection with discharge vessels. 5 is the wall of the discharge vessel and 6 and 7 are two electrodes connected respectively to minus and plus potentials. One or both of said electrodes may be located partly outside the wall of the vessel. The vessel contains gas such as inert gas or mercury vapour. The drawing illustrates an arrangement according to the invention, having tubular poles 8 and 9, capable of being rotated, and between which a magnetic field may be created.

The discharge vessel according to the invention may be provided with one or more magnets, located partly or entirely within or outside the vessel. The rotation of such magnets can be contrived, for example, in the same manner as with induction motors, by means of a field (not shown) capable of acting through the wall of the vessel, if need be.

10 is a magnet. Another magnet (not shown) may also be provided in conjunction with pole 9. Two or more magnets may be interconnected by means of one or more yokes.

The yokes may take the form of permanent magnets. But it is also possible to arrange the above mentioned poles as electro magnets whose energizing solenoids may be arranged rotatory. The poles may be made from magnetic and/or electrically conductng material. If two or more magnets act together, only one of them need be arranged for field rotation with two rotating magnets; the magnet fields may have opposite senses of rotation.

Two or more magnets may have the same direction, i.e. with poles of opposite signs co-operating, or they may be opposed, i.e. with poles of the same sign co-operating. Thus, fields according to the invention may be formed between north poles or between south poles.

If the magnetic field 1 is, for the main part, parallel to a discharge path, the latter will not be materially influenced until the magnetic field is rotated as described above. Depending on the direction of rotation and direction of the magnetic field, but primarily not on the direction of the discharge path, charged particles may then be forced inward toward or outward away from the centerline of the rotation, permitting the control of discharge processes, temperature conditions, radiation yields, etc.

Figure 3:
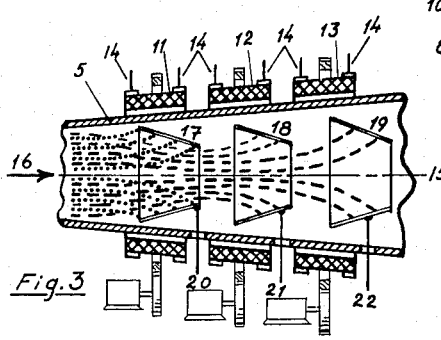
FIG. 3 shows an apparatus for generating electric energy.

FIG. 3 shows, schematically, an example of an embodiment of the invention, e.g. for generating electric energy and/or separating charges for the same or other purposes. 5 is a conically shaped wall of the vessel, preferably made from a material that is non-magnetic and electrically non-conducting under operating conditions. 11, 12, 13 are magnets for generating three magnetic fields with rotation according to the invention. The magnets are shown here as electro-magnets (solenoids) capable of being rotated around centetrline 15 and connected to commutator rings via conductors 14. Alternatively, the magnets may be designed with stationary energizing solenoids or permanent magnets used in conjunction with rotary poles.

Charges and/or charge carriers entering in the direction of arrow 16 may, depending on the polarity of the charge, direction of rotation, and direction of the magnetic field according to the invention, be influenced in a predetermined manner to move, selectively, toward the ring-shaped electrodes 17, 18 and/or 19 fitted with conductors 20, 21 and 22. The drawing shows how, for a specific phase condition, one type of charge is made to travel toward one electrode 17, and another type of charge toward the other two electrodes 18 and 19. By changing the direction of rotation, field strengths, directions, and relative phase conditions, of the magnetic fields—e.g. radially arranged electrodes may also be used—it is possible to extract energy, e.g. three-phase alternating current, from the arrangement.

The generation of energy may also occur through inductive and/or capacitive action by the respective charges and/or charge carriers.

Figure 4:
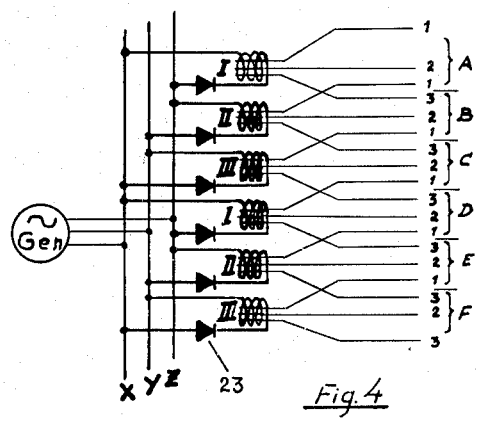
FIG. 4 shows an electro-magnet for generating magnetic fields with rotation.

FIG. 4 shows an example of an electro-magnet for generating magnetic fields with rotation according to the invention, the section shown in the drawing being an unfolded section of the mantle surface of a tubular or disc-shaped magnet.

The magnet, shown here in a design for connection to three-phase alternating current, consists of a number of laminations, I:1, 2, 3 . . ., II:1, 2, 3 . . ., and III:1, 2, 3 . . ., of magnetizable material, which form the nucleus and pole-pieces and which are magnetized by solenoids, or groups of solenoids, I, II and III, connected each between two phases $x$, $y$, $z$, via rectifiers 23. A number of these solenoids I, II, III may be employed, but any one of them, e.g. I, may consist of a single or a small number of solenoids. The direction of rotation of the magnetic field may be made to depend on the phase sequence.

The laminations are grouped into systems A, B, C, D, E, F . . ., comprising laminations from the various solenoids I, II, III.

Also when arranged stationary, the system described may produce a rotating field, that is, in the main, invariable as to strength and direction.

In the case of a very rapid "high-frequency" rotation, the material of the nucleus may be chosen accordingly, or omitted altogether, solenoids or loops being arranged toward the pole side to take the place of the laminations.

Figure 5:
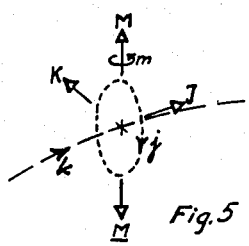
FIG. 5 shows a vector diagram.

FIG. 5 shows an example where, under the influence of, for instance, a field according to the invention, charges and/or charge carriers have been brought to rotate in the direction indicated by arrow $j$, torque vector J, and simultaneously, through the action of, for instance, one or more other fields, in the direction denoted by arrow $k$, torque vector K (e.g. circular, or spiral-shaped paths), in which case gyration forces, and the like, may impart additional moments in the direction indicated by arrow $m$, torque vector M.

In order to eliminate, partly or totally, additional moments of said nature, for instance, counteracting and/or compensating forces and/or moments may be introduced according to the invention, e.g. with rotation according to torque vector M, or by combining fields with rotation according to torque vectors J and M into one field with rotation according to their resultant vector $(J+M)$.

Figure 6:
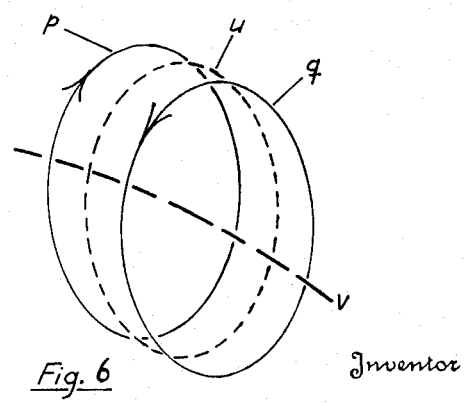
FIG. 6 shows schematically the rotation of rotating magnetic fields.

FIG. 6 gives an example of two magnetic fields according to the invention, having opposite directions of rotation $p$ and $q$, and the same, or opposed, field directions, and with charge paths within the active area of the magnetic field. The charge path $u$, for instance, may correspond to $k$ in FIG. 5, producing a force influence corresponding to M; or, for instance, charge path $v$ may correspond to $k$ in FIG. 5, in which case the direction of (tangential) forces may be reversed during the passage of the charge along path $v$, with or without a simultaneous reversal of the radial influence, so that moments M and M occur alternately, with successively opposite action.

The advantages and functional solutions that may be achieved by means of the present invention are manifold. The invention, which is not restricted to the forms of embodiment described in the text and illustrated in the drawings, may be extensively modified within the scope of the following claim.

I claim:

Apparatus for influencing electric charges comprising means for generating and maintaining a rotating magnetic field the direction of which is parallel to the axis of rotation thereof and means for supplying electric charges to said field.

References Cited by the Examiner

UNITED STATES PATENTS

| 2,724,075 | 11/1955 | Van Urk et al. | 317—200 |
| 2,928,004 | 3/1960 | Tadano et al. | 317—200 |
| 3,021,445 | 2/1962 | Wideroe et al. | 317—200 X |

BERNARD A. GILHEANY, *Primary Examiner.*

JOHN F. BURNS, *Examiner.*